April 2, 1929. A. F. NAUMAN 1,707,563
FOOD CHOPPER
Filed Feb. 21, 1927 2 Sheets-Sheet 1
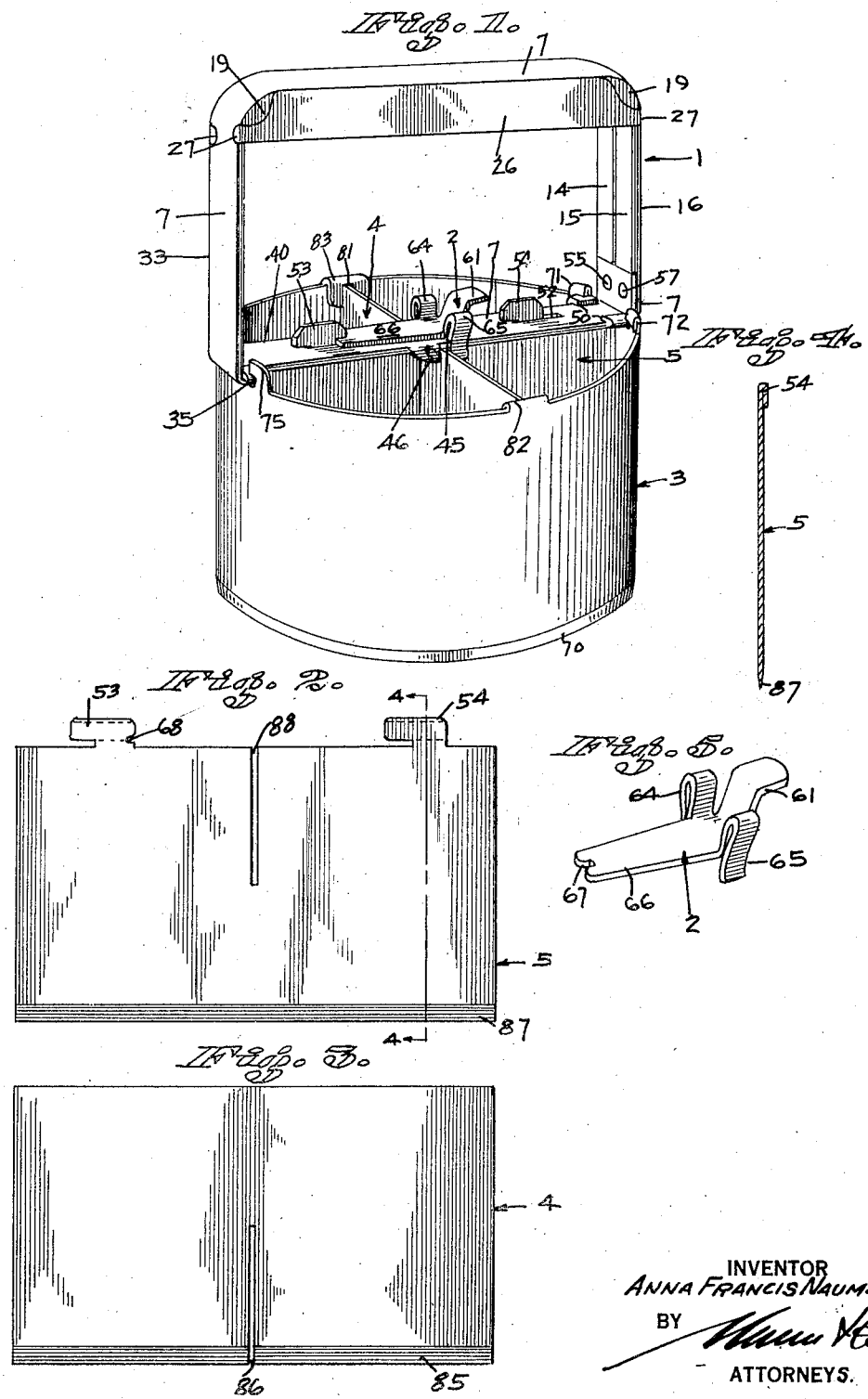
INVENTOR
ANNA FRANCIS NAUMAN
BY
ATTORNEYS.

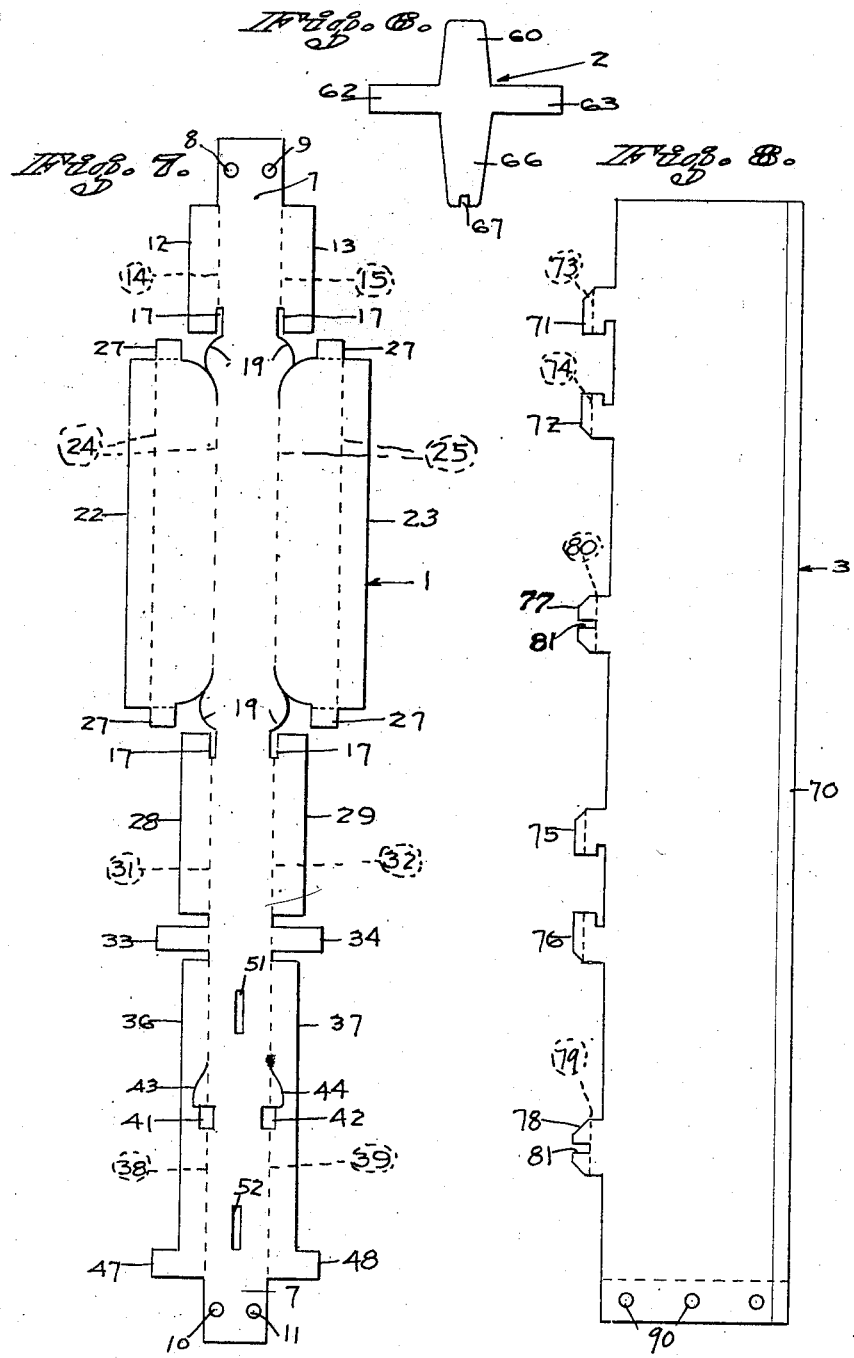

Patented Apr. 2, 1929.

1,707,563

UNITED STATES PATENT OFFICE.

ANNA FRANCIS NAUMAN, OF ST. HELENS, OREGON.

FOOD CHOPPER.

Application filed February 21, 1927. Serial No. 170,003.

This invention relates to food choppers and more specifically to that type of food chopper used for cutting food by hand.

One of the advantages of this type of food chopper is the large amount of cutting edge available, made possible by the arrangement of the knife edges.

Another advantage resides in the arrangement of parts, which provides easy access to all parts for cleaning. With this arrangement, the entire chopper may be disassembled by the removal of one clip and the parts taken out separately for polishing or cleaning or for sharpening the cutting edges.

The particular advantage of this invention is of manufacturing importance. The various parts are designed to be blanked out of suitable sheet metals. There is no soldering nor welding, and only two places of riveting are necessary in the entire construction. This makes for cheapness of material and is most desirable from a viewpoint of economy in manufacturing, as it confines the bulk of manufacturing costs to machinery operations, thereby eliminating a big percentage of expensive hand labor.

The foregoing advantages together with all subsequent ones that may develop in the description, constitute my invention which is more fully explained by referring to the accompanying drawings, in which:

Figure 1 is a perspective view showing the device assembled, ready for cutting;

Figure 2 is a view of one of the transverse cutting edges;

Figure 3 is a view of the other transverse cutting edge;

Figure 4 is a section on line 4—4 of Figure 2;

Figure 5 is a perspective view showing locking clip;

Figure 6 is a view showing the blank of the clip;

Figure 7 is a view showing the blank of the handle; and

Figure 8 is a view showing the blank of the circular cutting edge.

Referring to the drawings for a more detailed description thereof, and particularly to Figure 1, in which the device is shown ready for operation, it is observed to comprise five parts. The upper portion, or handle, generally designated 1, the locking clip, generally designated 2, the circular cutting edge, generally designated 3, a transverse cutting edge generally designated 4, and a second transverse cutting edge generally designated 5.

Taking the parts up in the above order, in Figure 7 a blank of part 1 as it is struck from suitable sheet metal is shown. By examining it, there is apparent a central strip portion 7 running from end to end. The two ends of portions 7 are provided with holes 8—9—10—11. Starting at the upper end, below the holes 8 and 9 there are provided wing like portions 12 and 13, adapted to be bent back underneath on the dotted lines 14 and 15, thus forming the upright part of the handle designated by the numeral 16. The slots 17 are designed to relieve the bend and allow the corner to be formed. Circular portions 19 furnish the ears to lock and strengthen the corners and are best shown in Figure 1.

Continuing below the eared portion there are provided two wing portions 22 and 23, designed to be bent back underneath on the dotted lines 24 and 25. This provides the side of the handle as best shown in Figure 1. On each end of these wing portions there are provided ears 27 which are designed to be bent over the central portion 7 and strengthen the handle as shown in Figure 1.

Following below this there is a repetition of slots 17 and wing portions 28 and 29 are designed to be bent back underneath along the dotted lines 31 and 32. This forms the other upright part of the handle designated in Figure 1 by the numeral 33. At the lower end of the wings 28 and 29 a right angle bend downward is made in the central strip 7. The elongated wings 34 are bent back on top, and form lugs 35, best shown in Figure 1.

It is to be understood that the right angle bend is put in only after all the forming of the strip has taken place. Below wings 33 and 34 there are wings 36 and 37 which are formed to be bent back on top, on lines 38 and 39. This forms the cross portion designated by numeral 40 in Figure 1. Holes 41 and 42 and cuts 43 and 44 are suitably located so that on bending they form cuts 45, Figure 1, and ears 46, Figure 1. Ears 47 and 48 are provided on the end of the wings 36 and 37. These ears are bent to form lugs 50 in Figure 1. Slots 51 and 52 are provided with central portion 7 to take the undercut lugs 53 and 54 shown on the cutting blade generally designated 5. At the lower edge of the wings 47 and 48 a right angle bend is made that brings the holes 10 and 11 into alignment with the holes 8 and 9, respectively. These are fastened together with rivets 55 and 56, shown in Figure 1. The above structure provides the handle.

The locking clip is blanked out of suitable spring metal, in the shape of a cross shown in Figure 6. The arm 5 is struck up as at 61, Figure 5, and forms a finger hold. The elongated wings 62 and 63 are shaped to form spring clips 64 and 65, Figure 5. The body portion 66 is provided with a notch 67 in the end opposite the finger hold, which notch engages the notch 68 let into the back of lug 53 on cutting edge generally designated 5. The above structure forms a spring clip that can be pressed into locking position as shown in Figure 1, and can be lifted out of locking position by the tip of the finger. The spring clips 64 and 65 fit into the cuts 45 provided on the handle.

The circular member generally designated 3 is blanked out of suitable cutting material and furnished with a cutting edge 70 on one edge. The other edge is provided with undercut lugs 71 and 72, the top part of which are crimped back on themselves on the lines 73 and 74. These furnish two of the hook members that hold the handle to the cutting blades. The other two hook members 75 and 76 are identical in formation. Two other members 77 and 78 which are slotted as at 81 are provided to be bent over on the dotted line 79 and 80, and form holding lugs 82 and 83 into which is slipped the cutting blade generally designated 4. The blank is then bent into a circle and joined either by welding, soldering, crimping or riveting. In this case rivet holes 90 are provided.

The transverse blade, generally designated 4, is formed of suitable cutting metal, provided with a cutting edge 85 and a slot 86.

The other cutting member, generally designated 5, is formed of suitable material and provided with a cutting edge 87, and a slot 88, and afore-mentioned lugs 53 and 54, said lugs 53 and 54 are crimped over at the top as shown in Figure 4.

The five parts of the device are quickly assembled, by placing slot 86 of blade 4 into slot 88 of blade 5 and then by holding the blades at a right angle, the cutting edges are brought flush. The blades held at a right angle are then placed within the circular member 3, the tip of blade 4 fitting into the slots 81. The slots 51 and 52 in the handle are then slipped over the lugs 53 and 54. The lugs 35 are slipped under the hook 75, while the lugs 50 slip under the hooks 71 and 72. The slots 51 and 52 are sufficiently long to permit a longitudinal sliding of the handle into a locking position, hereinbefore described, and the device is ready for chopping.

It is readily seen that a sturdy chopping mechanism is thus assembled in a simple, certain way.

The above constitutes a minute description of my invention, which is susceptible to certain variations and modifications, without departing from the spirit of the specification, drawings or appended claims.

I claim:

1. A chopping device of the character described, comprising substantially diametrically opposed plane cutting blades, intersecting substantially at their centers and each provided with an interlocking slot for bringing the cutting edges flush, a circular cutting edge formed from a single piece of suitable sheet metal, circumscribing said opposed cutting blades and provided with means for holding said opposed cutting blades, a detachable handle suitably formed from a single piece of suitable sheet metal, locking means provided on said circular blade and on one of said opposed blades to conjointly connect said handle to the cutting blade, and a spring locking clip for securing the blades to the handle.

2. In a chopping device, a supporting cross bar having slots therein, a cutting knife having L-shaped lugs thereon, said lugs being receivable in said slots and movable for connecting the cutter to the cross bar, and means for locking said lugs against movement.

3. In a food chopper, a handle constructed of a single piece of material, said handle having a cross bar for supporting cutting knives, uprights extending from said cross bar, and a hand grip portion connecting the free ends of said uprights, said hand grip portion having pieces bent downwardly and means carried by said pieces for securing said pieces to the uprights.

4. A food chopper comprising a handle having a cross piece, a circular cutter having opposed L-shaped lugs, said cross piece being threadable through the recesses of said lugs for locking said cross piece to said cutter.

5. In a food chopper, a cross piece, transverse knives secured together, locks carried by one of said knives and being attachable to said cross piece and a spring lock removably secured to said cross piece and engageable with one of said locks for preventing the accidental withdrawal of said lugs from said cross piece.

ANNA FRANCIS NAUMAN.